(12) United States Patent
Lee

(10) Patent No.: US 9,159,965 B2
(45) Date of Patent: Oct. 13, 2015

(54) BATTERY PACK

(71) Applicant: Won-Il Lee, Yongin-si (KR)

(72) Inventor: Won-Il Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 127 days.

(21) Appl. No.: 13/827,459

(22) Filed: Mar. 14, 2013

(65) Prior Publication Data

US 2014/0038016 A1 Feb. 6, 2014

(30) Foreign Application Priority Data

Aug. 1, 2012 (KR) .......................... 10-2012-0084484

(51) Int. Cl.
*H01M 2/10* (2006.01)
*H04M 1/02* (2006.01)

(52) U.S. Cl.
CPC ............... *H01M 2/10* (2013.01); *H01M 2/105* (2013.01); *H04M 1/0262* (2013.01); *H01M 2/1022* (2013.01)

(58) Field of Classification Search
None
See application file for complete search history.

(56) References Cited

U.S. PATENT DOCUMENTS

2005/0123825 A1* 6/2005 Nakamura ...................... 429/99
2010/0075216 A1 3/2010 Yoo
2010/0178548 A1 7/2010 Baek

FOREIGN PATENT DOCUMENTS

| KR | 10-2007-0080870 A | 8/2007 |
| KR | 10-2010-0033041 | 3/2010 |
| KR | 10-2010-0083725 | 7/2010 |

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A battery pack has a first housing including a first fastening portion and a first rib, and a second housing including a second fastening portion fastened to the first fastening portion and a second rib. The first rib is near the first fastening portion, and the second rib is between the first housing and the first rib.

14 Claims, 5 Drawing Sheets

BATTERY PACK

CROSS-REFERENCE TO RELATED APPLICATION

This application claims priority under 35 U.S.C. §119 to Korean Patent Application No. 10-2012-0084484, filed on Aug. 1, 2012, in the Korean Intellectual Property Office, the entire content of which is incorporated herein by reference.

BACKGROUND

A battery pack may be used in portable electronic devices such as a notebook computer, a personal digital assistance (PDA), and a camcorder. The battery pack may be manufactured by binding a plurality of bare cells as one unit. For example, the battery pack may include therein a plurality of secondary battery cells.

SUMMARY

Embodiments may be realized by providing a battery pack having a first housing including a first fastening portion and a first rib, and a second housing including a second fastening portion fastened to the first fastening portion and a second rib. The first rib is near the first fastening portion, and the second rib is between the first housing and the first rib.

The first rib may include a plurality of first ribs. One first rib of the plurality of first ribs may be adjacent to a corner of the first housing, and the one first rib may be spaced apart from the second rib at a predetermined interval.

The second rib may include a projection thereon. The projection may have a thickness as large as the predetermined interval at which the one first rib is spaced apart from the second rib. The projection may face the one first rib. The projection may be arranged at a predetermined distance from an end portion of the second rib.

The projection may include an inclined surface. The inclined surface of the projection may be inclined in an insertion direction of the second rib. The projection may have a tapered shape.

The projection may include at least two projections. Any one of the first and second fastening portions may have a hook shape, and the other of the first and second fastening portions may be a groove corresponding to the hook shape.

The first rib may include a first guide rib and a second guide rib, the first guide rib being closer to a corner of the first housing than the second guide rib. The first guide rib may be arranged at a first distance from the an outer wall of the first housing, and the second guide rib may be arranged at a second distance from the outer wall of the first housing, and the first distance may be greater than the second distance.

A portion of the second rib that faces the first guide rib may include a projection thereon and the projection may face the first guide rib. The projection may be spaced apart from an end of the second rib, and the end of the second rib may be arranged in a region between the first housing and the first guide rib. The projection may have a varying thickness within the region between the first housing and the first guide rib.

The projection may include a first inclined surface that is inclined toward the first guide rib, and the first inclined surface may be arranged at a first distance from the end of the second rib. The projection may include a second inclined surface that is inclined toward the second rib, and the second inclined surface may be arranged at a second distance from the end of the second rib. The second distance may be greater than the first distance.

The projection may include a first end portion having an increasing thickness as a distance from the end of the second rib is increased. The projection may include a second end portion having a decreasing thickness as a distance from the end of the second rib is increased. The second end portion of the projection may be aligned with the first guide rib.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
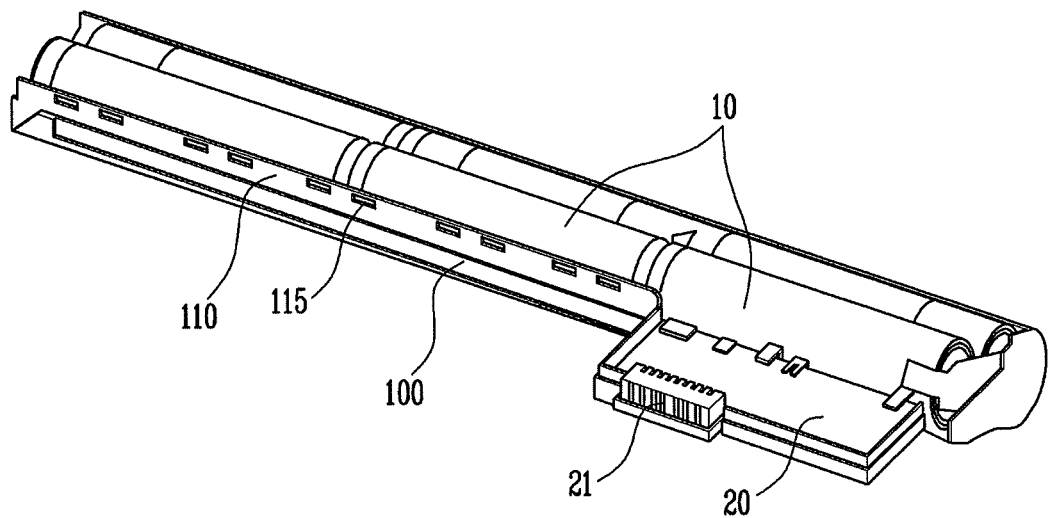
FIG. 1 illustrates a perspective view of a lower case of a battery pack, according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The drawings and description are to be regarded as illustrative in nature and not restrictive. When an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements. In the drawings, the thickness or size of layers may be exaggerated for clarity and not necessarily drawn to scale.

A battery pack according to an exemplary embodiment may include ones of an upper case, a lower case, battery cells, and a protective circuit module. Hereinafter, each component will be described in detail.

An exemplary lower case 100 will be described with reference to FIG. 1. FIG. 1 is a perspective view showing the lower case 100 of a battery pack.

Referring to FIG. 1, the lower case 100 accommodates a plurality of battery cells 10 therein. A protective circuit module accommodating portion 20 is provided at one side, e.g., only at one end, of the lower case 100. A protective circuit module (not shown), e.g., provided in the form of a printed circuit board, may be mounted in the protection circuit module accommodating portion 20. An external terminal 21 may be provided at one side of the protective circuit module accommodating portion 20.

The plurality of battery cells 10 may be electrically connected to the external terminal 21 through the protective circuit module to be mounted in the protective circuit module accommodating portion 20. The plurality of battery cells 10 may supply power to other electronic devices through the external terminal 21 and/or may be charged from an external power source.

The lower case 100 may have a reinforcing rib 110 formed at circumferences of the battery cells 10. For example, the reinforcing rib 110 may surround partial circumferences of the battery cells 10. The reinforcing rib 110 may be excluded or only partial included in a region of the lower case 100 including the protective circuit module accommodating portion 20.

The reinforcing rib 110 may be formed to extend from an assembly line in which the lower and upper cases 100 and 200 come in contact with each other when the battery pack is assembled. For example, the reinforcing rib 110 may be included at a joining region of the lower and upper cases 100 and 200. The reinforcing rib 110 may be guided to an inside of the upper case 200 when the battery pack is assembled, so that it is possible to improve the assembly performance of the case of the battery pack and to maintain/improve structural stability.

The lower case 100 may be coupled to the upper case 200 (see FIG. 2) described later so as to form an external housing of the battery pack. Accordingly, the battery cells 10 may be enclosed by the lower case 100 coupled with the upper case 200.

Figure 2:
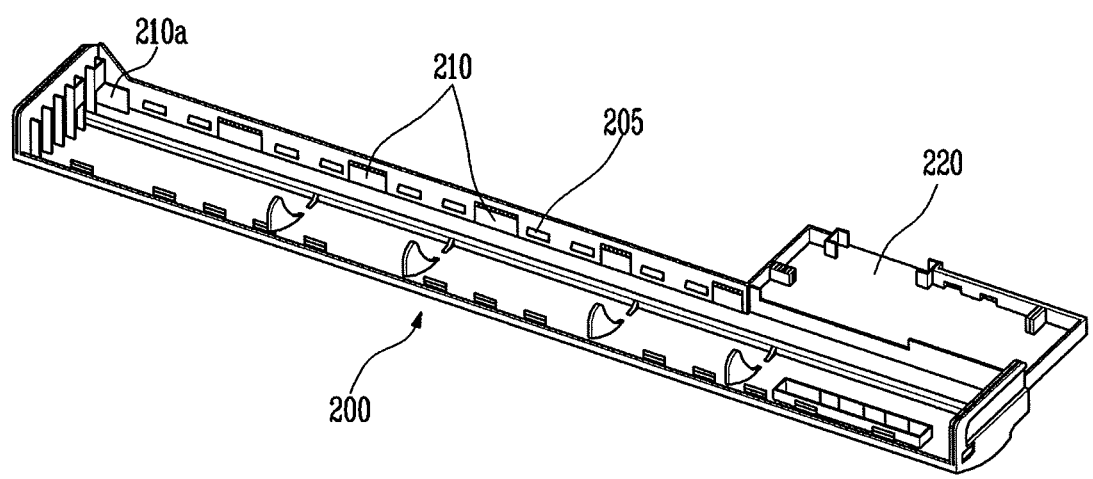
FIG. 2 illustrates a perspective view of an upper case of the battery pack, according to an exemplary embodiment.
Figure 3:
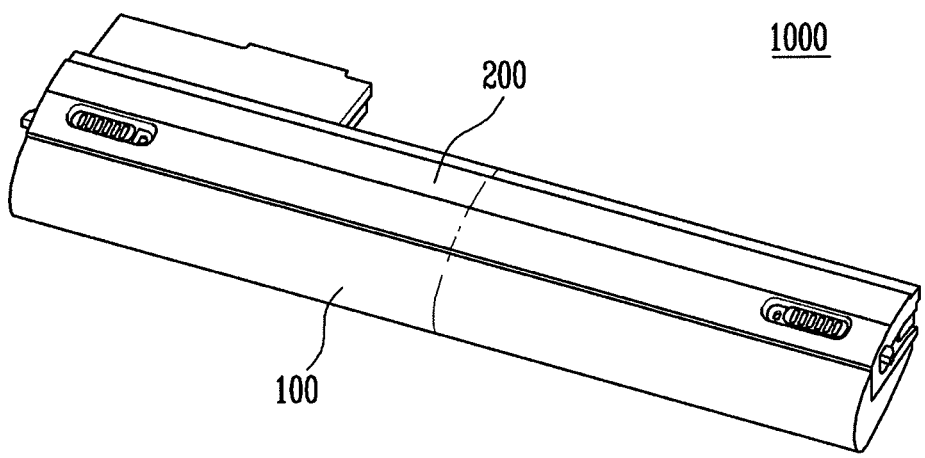
FIG. 3 illustrates a perspective view showing a state in which the battery pack is assembled, according to an exemplary embodiment.

The upper case 200 will be described with reference to FIGS. 2 and 3. FIG. 2 is a perspective view showing the upper case of the battery pack according to an exemplary embodiment. FIG. 3 is a perspective view showing a state in which the battery pack is assembled according to an exemplary embodiment.

The upper case 200 covers the lower case 100 (see FIG. 1) described above so as to form an external housing. The upper case 200 may have a protective circuit module accommodating portion 220 in which the protective circuit module is mounted. The protective circuit module accommodating portion 220 of the upper case 200 and the protective circuit module accommodating portion 20 of the lower case 100 may be coupled together to accommodate the protective circuit module therebetween.

The upper case 200 may include a guide rib 210 that guides and supports the reinforcing rib 110 (see FIG. 1) of the lower case 100 described above. The guide rib 210 may be provided with a plurality of guide ribs. For example, a guide rib 210a of the guide ribs 210, may be formed at a corner of the upper case 200. The guide rib 210a may be formed differently from the general guide ribs 210. The guide rib 210a will be described in detail in a related part. As shown in FIG. 3, the upper case 200 is coupled to the lower case 100 so as to form the external housing of the battery pack 1000.

Figure 4:
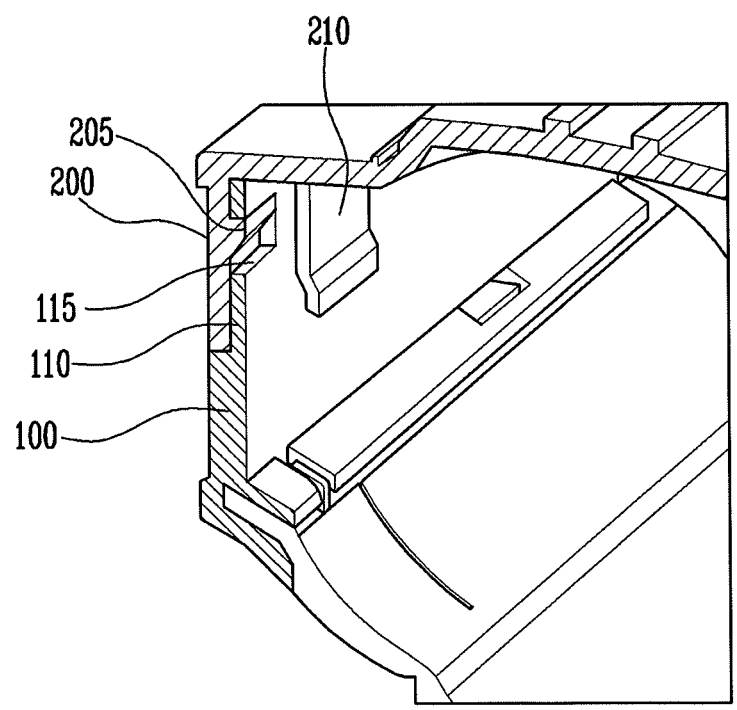
FIG. 4 illustrates a partial cut-away view showing an exemplary coupling structure of an assembled battery pack.
Figure 5A:
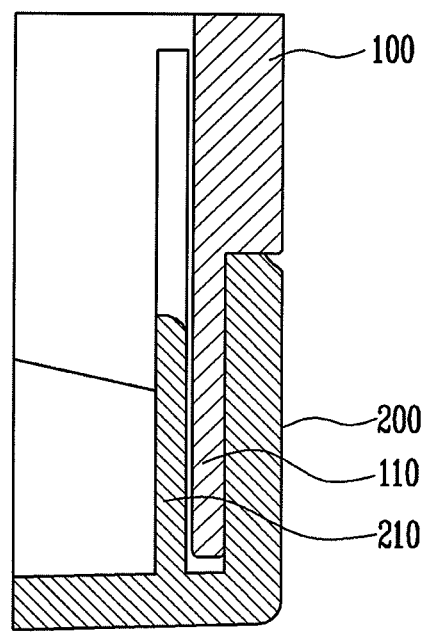
FIGS. 5A and 5B illustrate sectional views showing coupling structures including guide ribs according to an exemplary embodiment.
Figure 5B:
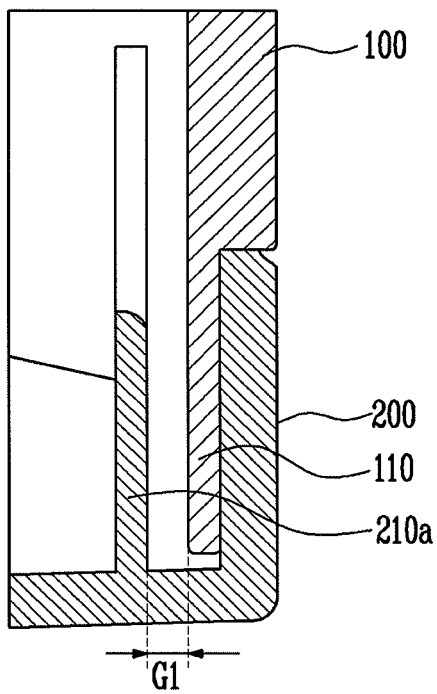

The coupling structure between the upper and lower cases 200 and 100 will be described with reference to FIGS. 4 to 5B. FIG. 4 is a partial cut-away view showing a coupling structure of the assembled battery pack according to an exemplary embodiment. FIG. 5A is a sectional view showing a coupling structure including a guide rib 210, according to an exemplary embodiment. FIG. 5B is a sectional view showing a coupling structure including a guide rib 210a, according to the exemplary embodiment.

A fastening portion 205, through which the upper case 200 may be fastened to the lower case 100, may be formed at an inside of the upper case 200. The fastening portion 205 may include a plurality of fastening portions 205. The fastening portion 205 may be formed to have a hook-shaped fastening structure as shown in FIG. 4. Although various fastening structures may be applied to the fastening portion 205. The hook-shaped fastening structure is simple and may be easily manufactured.

A fastening portion 115 corresponding to the fastening portion 205 described above, may be formed in the reinforcing rib 110. Referring to FIG. 4, an end portion of the fastening portion 205 may extend through the fastening portion 115. The fastening portion 115 may include a plurality of fastening portions 115 that each correspond to one of the plurality of fastening portions 205. The fastening portion 115 may be a fastening groove 115. For example, the fastening portion 205 may be formed on an inner surface of the upper case 200, and the fastening portion 115 corresponding to the fastening portion 205 may be formed on an inner surface of the lower case 100.

The fastening portion 115 may be a groove and/or a through hole that accommodates a portion of the fastening portion 205 therein when the upper case 200 is coupled to the lower case 100, e.g., the fastening portion 115 and the fastening portion 205 may be in an interlocking relationship with each other.

The guide ribs 210 may be provided in the upper case 200. The guide ribs 210 may be spaced apart from each other along at least one side of the upper case 200. The guide ribs 210 may be formed in the state in which the guide ribs 210 are spaced apart from an outer wall of the upper case 200 at a predetermined interval. For example, the guide ribs 210 may be spaced apart from an inner surface of the outer wall of the upper case 200 by the predetermined interval. When the upper and lower cases 200 and 100 are coupled to each other, the reinforcing rib 110 may be guided and inserted between the guide ribs 210 and the outer wall of the upper case 200.

According to an exemplary embodiment, the guide ribs 210 may be formed adjacent to and/or near the fastening portion 205 and the fastening portion 115. The guide ribs 210 may be positioned adjacent to the fastening portion 205 and the fastening portion 115, so as to reinforce and maintain the fastening strength between the hook 205 and the fastening portion 115. For example, the guide ribs 210 may face ones of the fastening portions 205 and others of the fastening portions 205 may be near the guide ribs 210.

As shown in FIG. 5A, the guide ribs 210 and the upper case 200 may be formed to be spaced apart from each other at an interval that is about the same as or slightly larger than a thickness of the reinforcing rib 110, so that the reinforcing rib 110 may be inserted in a forcible insertion manner or may be inserted into a small gap.

In a case where the reinforcing rib 110 is formed in the entire battery pack, e.g., along an entire outer perimeter of the lower case 100, a defect in the manufacturing of the battery pack may occur. For example, the defect, such as an improperly bent portion, a broken portion, or the like, may occur in a part of the reinforcing rib 110 formed at a corner of the battery pack.

According to an exemplary embodiment, the guide rib 210a and the outer wall of the upper case 200 may be sufficiently spaced apart from each other so that the reinforcing rib 110 may be inserted to have a sufficient space between the guide rib 210a and the outer wall of the upper case 200 as shown in FIG. 5B. For example, the space between the guide rib 210a and the inner surface of the outer wall of the upper case 200 may be larger than a space between the guide rib 210 and the inner surface of the outer wall of the upper case 200, e.g., as illustrated in FIGS. 5A and 5B.

Referring to FIG. 5B, when the upper case 200 is coupled to the lower case 100, the guide rib 210a may be spaced apart from the reinforcing rib 110 by a gap G1. Accordingly, in the coupled state of the lower and upper cases 100 and 200, the gap G1 may exist between the guide rib 210a and the inner surface of the outer wall of the upper case 200.

Figure 6:
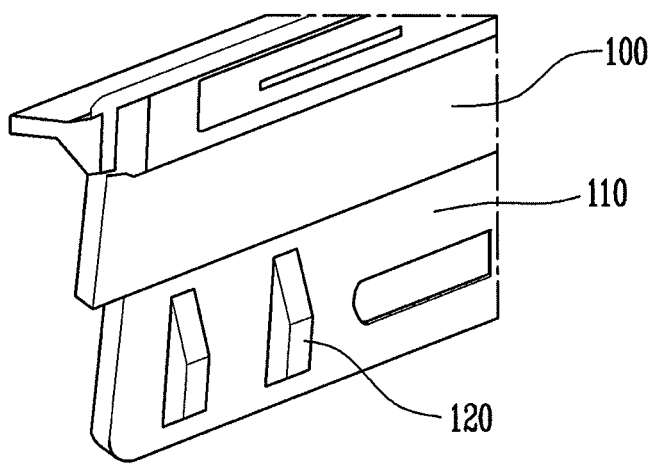
FIG. 6 illustrates a partial perspective view showing a lower case according to an exemplary embodiment.
Figure 7:
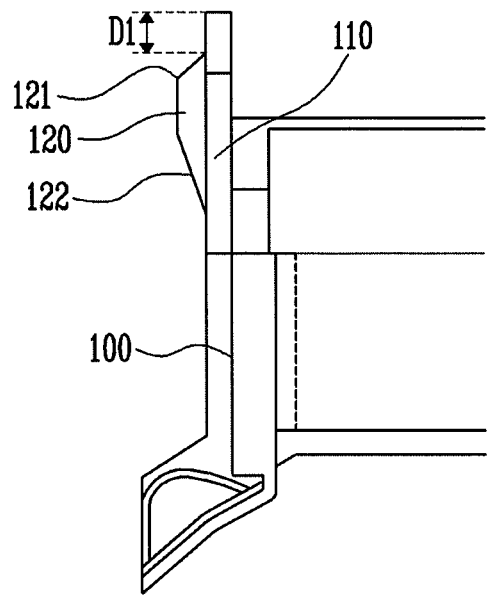
FIG. 7 illustrates a partial side view showing the lower case according to the exemplary embodiment.
Figure 8:
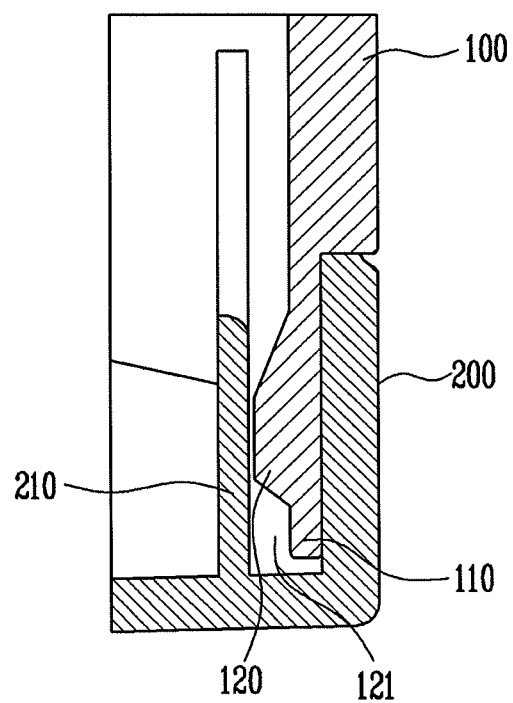
FIG. 8 illustrates a sectional view showing a state in which the lower case of FIG. 6 and the upper case including the guide rib of FIG. 5B are coupled to each other.

The coupling structure formed in the vicinity of a corner will be described in detail with reference to FIGS. 6 to 8. FIG. 6 is a partial perspective view showing a lower case 100 according to an exemplary embodiment. FIG. 7 is a partial side view showing the lower case 100 according to an exemplary embodiment. FIG. 8 is a sectional view showing a state in which the lower case 100 of FIG. 6 and the upper case 200 including the guide rib 210a of FIG. 5B are coupled to each other.

In FIG. 6, there may occur a case where the reinforcing rib 110 of the lower case 100 is not sufficiently supported in the vicinity of a corner of the battery pack. Accordingly, the corner of the battery pack may be slightly recessed. In order to reduce the possibility of such a case, a projection 120 may be formed on the reinforcing rib 110 of the lower case 100 as shown in FIG. 6. The projection 120 may include a plurality of projections 120 that are spaced apart along the reinforcing rib 110, e.g., in the vicinity corresponding to the corner of the battery pack. According to an exemplary embodiment, the projections 120 may only be formed in the vicinity corresponding to the corner so as to be excluded in other regions further away from the corner of the battery pack.

Referring to FIG. 7, the projection 120 may be formed in the state in which one end portion 121 of the projection 120 is spaced apart from an end of the reinforcing rib 110 at a predetermined distance D1. In this case, the one end portion 121 of the projection 120 may be formed inclined to the insertion direction of the reinforcing rib 110, so that the reinforcing rib 110 can be easily inserted between the guide rib 210a and the outer wall of the upper case 200 as shown in FIG. 8. For example, a surface of the one end portion 121 facing the guide rib 210a may be inclined.

For example, the predetermined distance D1 may enable the end of the reinforcing rib 110 to be first easily interested between the guide rib 210a and the inner surface of the outer wall of the upper case 200. Further, the one end portion 121 of the projection 120 may be further inclined, e.g., arranged at an acute angle with respect to the reinforcing rib 110, to further enable easier insertion of a portion of the projection 120 closer to the end of the reinforcing rib 110. In other words, a thickness of the projection 120 may initially gradually increase as a distance for the end of the reinforcing rib 110 increases.

The projection 120 may further include another end portion 122 that is formed to be inclined, like the one end portion 121, so that the projection 120 is formed in a tapered shape. For example, in the other end portion 122, a thickness of the projection 120 may gradually decrease as a distance from the end of the reinforcing rib 110 increases. The projection 120 may also include a plateau portion, e.g., between the one end portion 121 and the other end portion 122, in which a thickness is substantially unchanged. A tapered edge of the other end portion 122 may be aligned with, e.g., horizontally aligned with, an edge of the guide rib 210a.

According to an exemplary embodiment, in a case where the reinforcing rib 110 is inserted between the outer wall of the upper case 200 and the guide rib 210a formed in the vicinity of the corner of the battery pack, the projection 120 allows the guide rib 210a to sufficiently support the reinforcing rib 110. For example, the projection 120 fills a portion of the gap G1 between the guide rib 210a and the outer wall of the upper case 200.

By way of summation and review, a battery pack may include a plurality of battery cells that each have a limitation of its capacity. The battery pack may be mounted in, e.g., a notebook computer, a PDA, a camcorder and the like, so as to supply a predetermined voltage to the device to which the battery pack is connected, or may be connected to a charger so as to be charged.

The battery pack may also include ones of a first case, the plurality of battery cells accommodated in the first case, a protective circuit module electrically connected to the battery cells so as to control a charging/discharging state of the battery cells, a second case that covers the first case so as to protect the battery cells and the protective circuit module from an external environment, and the like. For example, a high-capacity cylindrical lithium ion bare cell and the like may be used as the battery cell.

A lithium ion battery cell may be broken because of overcharging or over-discharging, and the charging and discharging of the lithium ion battery may be different depending on characteristics of an individual battery. Therefore, in a battery pack particularly using a plurality of lithium ion secondary batteries as battery cells, the battery pack may be connected to a protective circuit such as a circuit that equalizes a charging state by controlling charging and discharging of all the batteries or a circuit that may prevent overcharging and overdischarging. The protective circuit may be formed on a printed circuit board (PCB) of a protective circuit module (PCM). The protective circuit may be connected to the battery cells, e.g., by a tab made of nickel (Ni) or a conductive wire.

Various-shaped ribs may be formed in the case of the battery pack so as to support the coupling between the first and second cases and to reduce the possibility of and/or prevent the deformation of the case of the battery pack. However, an assembling failure may occur at a corner portion of the battery pack in the process of forming the ribs and assembling the case of the battery pack.

In contrast, embodiments provide a coupling structure of an external case of a battery pack having an improved coupling structure of an external case of a battery pack. Accordingly, it is possible to reduce the possibility of and/or prevent production cost from being wasted due to an assembly defect of the case of the battery pack and to improve the assembly workability of the battery pack. Further, it is possible to improve the assembly performance of the case of the battery pack by improving the mold production and injection assembly property.

Embodiments also provide a structure of a battery pack that can achieve the assembly property of the battery pack and the improvement of a step difference in assembling of the battery pack. Embodiments further provide a structure of a battery pack, in which mold production and injection assembly property issues are minimized and/or prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a first housing including a first fastening portion at an inner surface of an outer wall of the first housing and a first rib spaced apart from the inner surface of the outer wall of the first housing; and
a second housing including a second fastening portion fastened to the first fastening portion and a second rib, wherein:
the first rib is adjacent to the first fastening portion, and the second rib is between the inner surface of the outer wall of the first housing and the first rib,
the first rib includes a first guide rib and a second guide rib, the first guide rib being closer to a corner of the first housing than the second guide rib,
the first guide rib is arranged at a first distance from an outer wall of the first housing, and the second guide rib is arranged at a second distance from the outer wall of the first housing, the first distance being greater than the second distance,
a part of the second rib that faces the first guide rib includes a projection thereon, the projection facing the first guide rib,
the projection is spaced apart from an end of the second rib, the end of the second rib being arranged in a region between the first housing and the first guide rib,
the projection includes a first inclined surface that is inclined toward the first guide rib, the first inclined surface being arranged at a first distance from the end of the second rib,
the projection includes a second inclined surface that is inclined toward the second rib, the second inclined surface being arranged at a second distance from the end of the second rib, and
the second distance is greater than the first distance.

2. The battery pack as claimed in claim 1, wherein the first rib includes a plurality of first ribs.

3. The battery pack as claimed in claim 2, wherein one first rib of the plurality of first ribs is adjacent to a corner of the first housing, and the one first rib is spaced apart from the second rib at a predetermined interval in an insertion region of the second rib.

4. The battery pack as claimed in claim 3, wherein the second rib includes a projection thereon, the projection having a thickness as large as the predetermined interval at which the one first rib is spaced apart from the second rib.

5. The battery pack as claimed in claim 4, wherein the projection extends in a direction toward the one first rib.

6. The battery pack as claimed in claim 4, wherein the projection is arranged at a predetermined distance from an end portion of the second rib.

7. The battery pack as claimed in claim 4, wherein the projection includes an inclined surface.

8. The battery pack as claimed in claim 7, wherein the inclined surface of the projection is inclined in an insertion direction of the second rib.

9. The battery pack as claimed in claim 8, wherein the projection has a tapered shape.

10. The battery pack as claimed in claim 4, wherein the projection includes at least two projections.

11. The battery pack as claimed in claim 1, wherein the first fastening portion has a hook shape, and the second fastening portion is a groove corresponding to the hook shape.

12. The battery pack as claimed in claim 1, wherein the projection has a varying thickness within the region between the first housing and the first guide rib.

13. A battery pack, comprising:
a first housing including a first fastening portion at an inner surface of an outer wall of the first housing and a first rib spaced apart from the inner surface of the outer wall of the first housing; and
a second housing including a second fastening portion fastened to the first fastening portion and a second rib, wherein:
the first rib is adjacent to the first fastening portion, and the second rib is between the inner surface of the outer wall of the first housing and the first rib,
the first rib includes a first guide rib and a second guide rib, the first guide rib being closer to a corner of the first housing than the second guide rib,
the first guide rib is arranged at a first distance from an outer wall of the first housing, and the second guide rib is arranged at a second distance from the outer wall of the first housing, the first distance being greater than the second distance,
a part of the second rib that faces the first guide rib includes a projection thereon, the projection facing the first guide rib,
the projection is spaced apart from an end of the second rib, the end of the second rib being arranged in a region between the first housing and the first guide rib,
the projection includes a first end portion having an increasing thickness as a distance from the end of the second rib is increased, and
the projection includes a second end portion having a decreasing thickness as the distance from the end of the second rib is increased.

14. The battery pack as claimed in claim 13, wherein the second end portion of the projection is aligned with the first guide rib.

* * * * *